United States Patent [19]
Lanius et al.

[11] Patent Number: 4,729,474
[45] Date of Patent: Mar. 8, 1988

[54] SATCHEL-STYLE TACKLE BOX

[75] Inventors: Charles A. Lanius, Prairie du Sac; William R. Sauey, Baraboo, both of Wis.

[73] Assignee: Flambeau Corporation, Baraboo, Wis.

[21] Appl. No.: 890,837

[22] Filed: Jul. 25, 1986

[51] Int. Cl.$^4$ .................. B65D 85/00; A01K 97/00
[52] U.S. Cl. .................. 206/315.11; 206/315.1; 312/244; 312/DIG. 33; 43/54.1
[58] Field of Search .................. 206/315.11, 315.1; 190/39, 115; 292/204, 207, 252; 312/330 R, 244, DIG. 33, 100; 109/74, 75, 77, 79; 43/54.1

[56] References Cited

U.S. PATENT DOCUMENTS

| | | | |
|---|---|---|---|
| 591,547 | 10/1897 | O'Neil | 190/39 X |
| 1,515,091 | 11/1924 | Brower et al. | 292/204 |
| 1,674,352 | 6/1928 | Adams | 206/315.11 X |
| 2,510,643 | 6/1950 | Long | 190/115 X |
| 2,555,717 | 6/1951 | Turpin | 292/204 X |
| 2,613,623 | 10/1952 | Behrens | 109/79 X |
| 2,711,050 | 6/1955 | McIntyre | 206/315.11 X |
| 2,762,677 | 9/1956 | Reeves | 312/330 R X |
| 3,350,810 | 11/1967 | Warner et al. | 206/315.11 |
| 3,739,886 | 6/1973 | Kertzman | 190/115 X |
| 4,006,553 | 2/1977 | Porter et al. | 206/315.11 X |
| 4,067,422 | 1/1978 | Eberle | 190/112 |
| 4,128,170 | 12/1978 | Elliott | 206/315.11 |
| 4,353,182 | 10/1982 | Junkas et al. | 206/315.11 X |
| 4,561,526 | 12/1985 | Winter et al. | 190/39 X |

Primary Examiner—Stephen Marcus
Assistant Examiner—T. Graveline
Attorney, Agent, or Firm—Allegretti, Newitt, Witcoff & McAndrews

[57] ABSTRACT

An improved satchel-style tackle box wherein access to the storage compartments can be had through the upper end or through the front wall of the box. Hence with the box of the present invention, there is no need to turn the box over in order to obtain access to all its storage compartments. The elimination of the need to turn the box over is accomplished by adding a pull out drawer to the lower part of the box. One or more storage compartments are then developed in the box above the drawer storage compartment. The projecting edge around the drawer opening in the box cooperate to prevent the rain water and other casual water from getting into the box, between the drawer and the opening, when the drawer is closed. Novel latches secure the drawer in its closed position and assist in preventing the ingress of water into the drawer. The latches are readily moved out of the way when the drawer is to be opened. A handle is mounted on the front wall of the box to facilitate carrying the box. A novel keeper is used to retain the handle away from the drawer when the handle is not being used.

13 Claims, 8 Drawing Figures

U.S. Patent   Mar. 8, 1988   Sheet 1 of 3   4,729,474
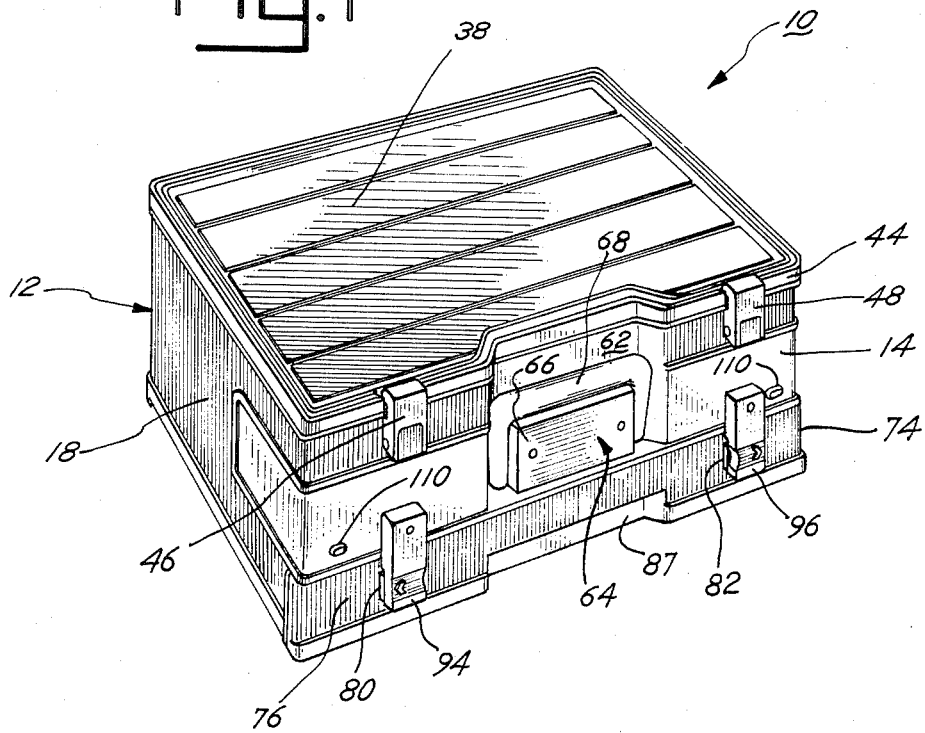
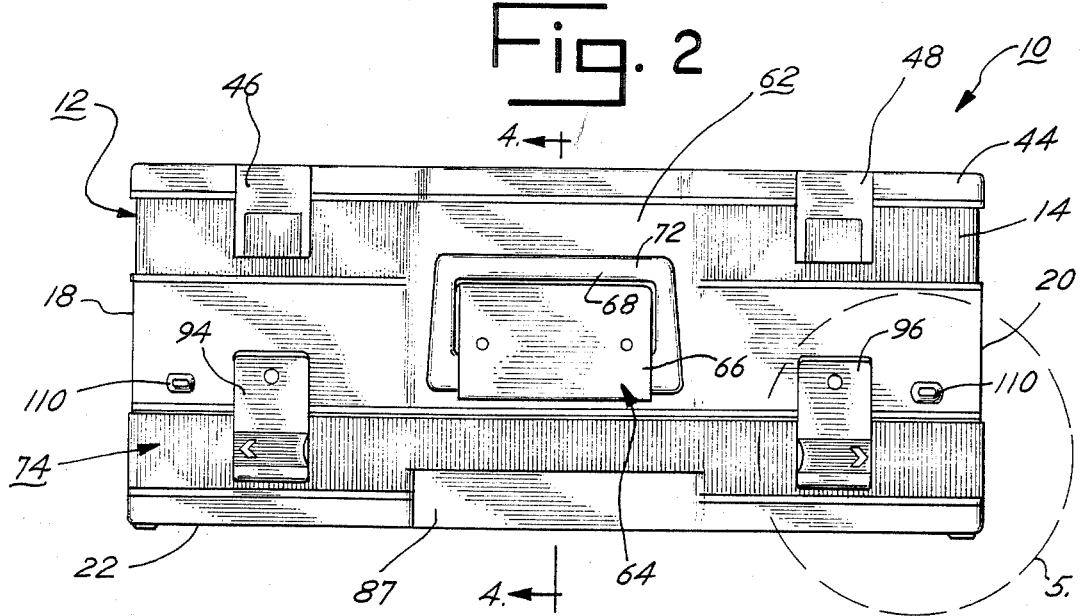

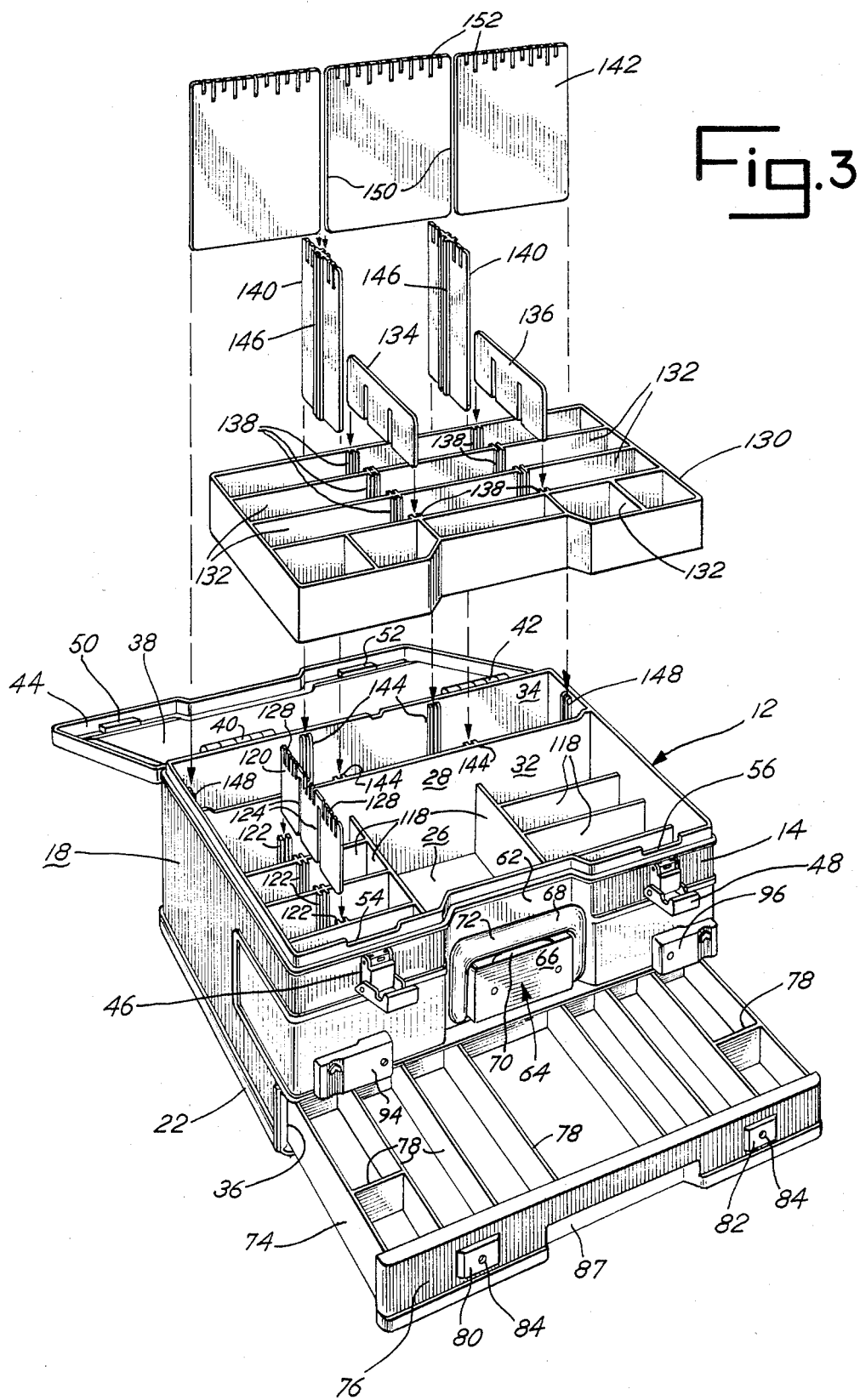

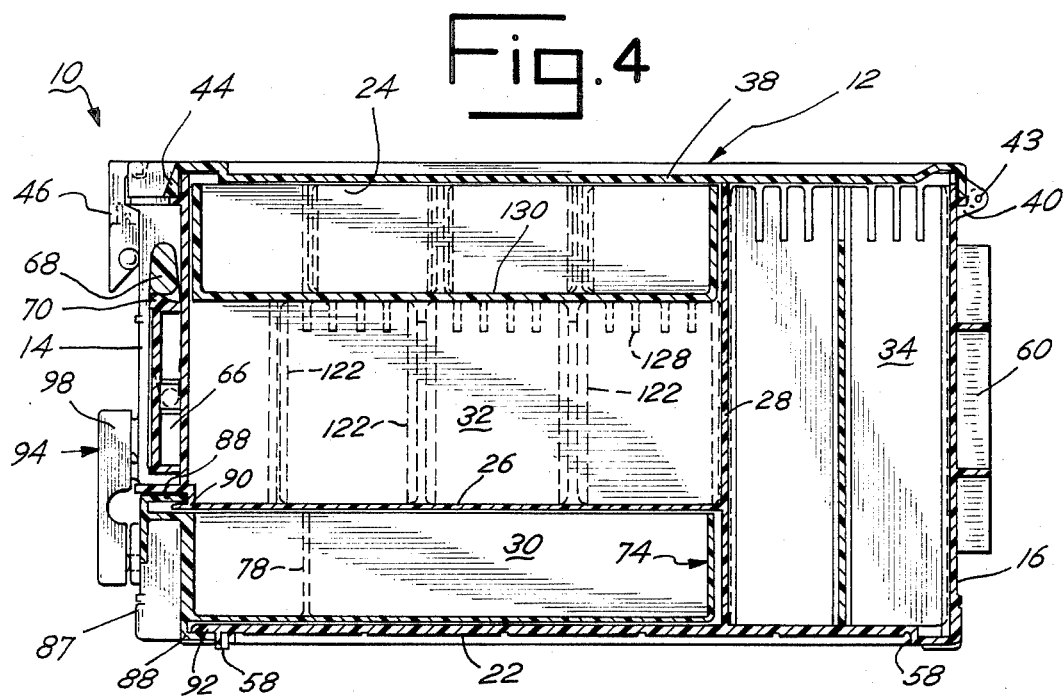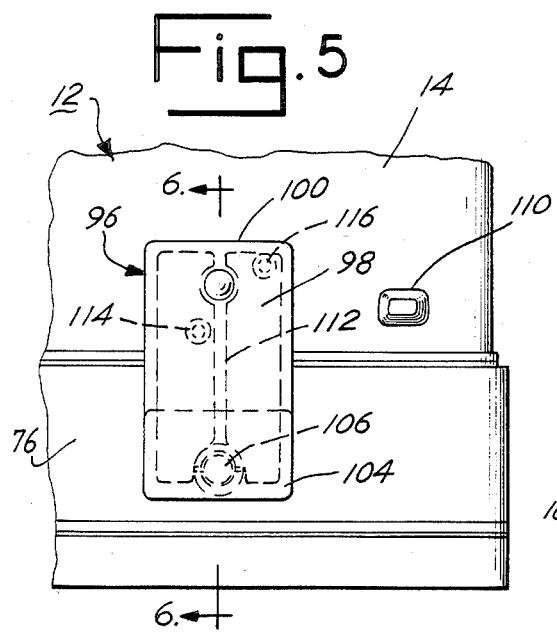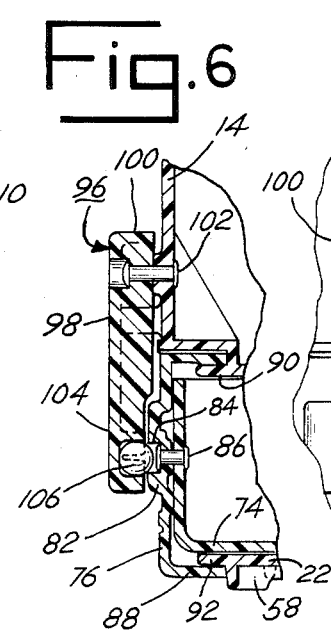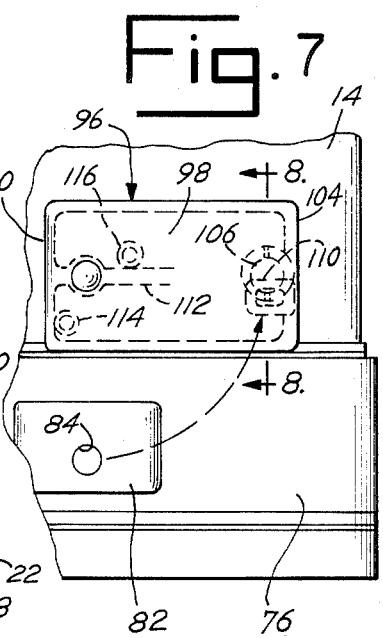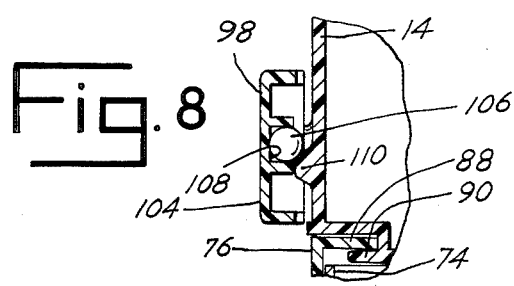

SATCHEL-STYLE TACKLE BOX

BACKGROUND OF THE INVENTION

The present invention relates generally to boxes or containers particularly adapted for use by fisherman to store and transport their tackle, baits, fishing accessories, and other equipment. More specifically, this invention relates to a special type of box known as a satchel-style tackle box. Such a satchel-style tackle box could, of course, also be used by hobbyists, handymen, and others as well as by fishermen.

Satchel-style tackle boxes have been known and used in the past. Generally they have a rectangular parellelipiped shape. It is thought that they derive their name from the similarity of their shape to that of satchel style brief cases. Besides their shape, satchel-type tackle boxes differ from other styles of tackle boxes in that they usually have larger and deeper storage compartments. They also usually do not have the stacked, foldable multiple tray arrangements found in the other styles of tackle boxes.

In the past, access to the interior storage compartments in prior satchel-style tackle boxes has been through the lid-closed upper end of the box and through the lid-closed bottom of the box. To gain access to a storage compartment adjacent to the upper end of a prior satchel-style box, the bottom of the box is placed on the ground or other surface, and the lid covering the upper end of the box is opened. Thereafter, to gain access to a storage compartment adjacent to the bottom of the box, the upper lid must be closed, the box turned over, the upper end placed on the ground or other surface, and the lid covering the bottom of the box opened. This need to turn the box over in order to gain access to all the storage compartments in the box is a disadvantage. It is cumbersome and burdensome. Besides, turning the box over causes the contents of the box to become disorganized and jumbled.

SUMMARY OF THE INVENTION

In principal aspect, the present invention comprises an improved satchel-style tackle box wherein access to the storage compartments can be had through the upper end or through the front wall of the box. Hence with the box of the present invention, there is no need to turn the box over in order to obtain access to all its storage compartments. The elimination of the need to turn the box over is accomplished by adding a pull out drawer to the lower part of the box. One or more storage compartments are then developed in the box above the drawer storage compartment.

Additionally, the satchel-style tackle box of the present invention includes a number of other advantageous features that make the box extremely attractive to the fisherman, hobbyist and handyman. As noted, there is a storage drawer mounted in a storage compartment in the front wall near the bottom of the box. The front of the drawer and the projecting edge around the drawer opening in the box cooperate to prevent the rain water and other casual water from getting into the box, between the drawer and the opening, when the drawer is closed. Novel latches secure the drawer in its closed position and assist in preventing the ingress of water into the drawer. The latches are readily moved out of the way when the drawer is to be opened.

A handle is mounted on the front wall of the box to facilitate carrying the box. A novel keeper is used to retain the handle away from the drawer when the handle is not being used.

Access to the other storage compartments in the box is through a hinged lid on the upper end of the box. These storage compartments are sub-divided into smaller storage areas by a plurality of dividing walls, some of which are removable from the box so as to permit the user to change the size of the storage areas. The upper ends of these removable dividing walls include notches from which baits and the like may be hung. One of these compartments is adapted to accommodate a removable, lift-out storage tray.

Thus, it is a primary object of the present invention to provide an improved satchel-style box adapted for use by fishermen, hobbyist, handymen and the like. A related object is to provide an improved satchel-style box of the type described which is particularly adapted for use by fishermen to store and transport their tackle, baits, fishing accessories, and other equipment. A further related object is to provide an improved satchel-style tackle box of the type described wherein access to the storage compartments in the box may be had without the need to turn the box over.

Another object of the present invention is to provide an improved satchel-style tackle box wherein access to the storage compartments in the box is through an opening in the front wall of the box and through the open upper end of the box, wherein a storage drawer is mounted in an opening in the front wall of the box, and opening serves to prevent the rain water and other casual water from getting into the box when the drawer is closed. A related object is to provide latches that secure the drawer in its closed position and that additionally urge the tongue and grove structure into close cooperation. A further related object is to provide an improved satchel-style tackle box of the type described wherein each of the drawer latches carries a ball that is adapted to be received within a recess formed on a projection on the front of the drawer, when the drawer is in its closed position, and wherein a lug cooperates with the ball to hold the latch away from the drawer when the drawer is being opened.

Still another object of the present invention is to provide an improved stachel-style tackle box of the type described having a carrying handle that may be easily restrained by an inexpensive keeper in a position where it does not interfere with the operation of the drawer.

A further object of the present invention is to provide an improved satchel-style tackle box of the type described wherein the storage compartment, accessible through the upper end of the box, are sub-divided into storage areas by a plurality of dividing walls and wherein at least some of the dividing walls are readily removable from the box so as to enable the user of the box to change the size of the storage areas. A related object of the present invention is to provide an improved satchel-style tackle box of the type described wherein at least some of the dividing walls have notches at their upper ends so that baits and the like can be hung from these notches. Another related object is to provide an improved satchel-style tackle box of the type described wherein the heights of the dividing walls is one of the storage compartments is less than the height of the compartment so that a removable, lift-out storage tray may be positioned in that compartment and be supported in that compartment on the upper ends of the dividing walls.

These and other objects, advantages and features of the present invention will be set forth in the detailed description of the preferred embodiment of the present invention which follows.

BRIEF DESCRIPTION OF THE DRAWINGS

In the detailed description of the preferred embodiment which follows, reference will be made to the drawings comprised of the following figures:

FIG. 1 is a front perspective view of the improved satchel-style tackle box of the present invention wherein the top lid and the drawer are shown in their closed and latched position; and FIG. 2 is a front elevational view of the box of FIG. 1; and FIG. 3 is a partially exploded perspective view of the box of FIG. 1 wherein the top lid and the drawer are shown in their opened, unlatched positions; and FIG. 4 is a cross-sectional view taken along the line 4—4 in FIG. 2; and FIG. 5 is an enlarged view of a corner of the box of FIG. 2, as designated by the line 5 in FIG. 2; and FIG. 6 is an enlarged, partial cross-sectional view taken along the line 6—6 in FIG. 5; and FIG. 7 is an enlarged view of the latch shown in FIG. 5 except that the latch is in its drawer opened position; and FIG. 8 is an enlarged partial cross-sectional view taken along the line 8—8 in FIG. 7.

DESCRIPTION OF THE PREFERRED EMBODIMENT

Referring now to FIGS. 1-4, a satchel-style box of the present invention is shown generally at 10 and comprises a one piece body 12 that may be molded from a plastic material such as polypropylene. The advantages of such a one piece construction is in economy of manufacture and also in preventing water from leaking into the box 10.

The body 12 includes a front wall 14, a rear wall 16, a left side wall 18, a right side wall 20, and a bottom wall 22. The upper end of the body 12, generally designated at 24, is open. Additionally, the body 12 includes integral, internal walls 26 and 28; the wall 26 being horizontally disposed and the wall 28 being vertically disposed.

The vertical wall 28 extends between the side walls 18 and 20 and projects upwardly from the bottom wall 22 so that its upper end is generally the same height as the upper ends of the front, rear and side walls 14-20. Wall 28 is positioned approximately two-thirds to three-quarters of the way, from the front to back, between the front and rear walls 14 and 16. Horizontal wall 26 extends between the side walls 18 and 20 and from the front wall 14 back to the wall 28. It is disposed approximately one-third of the way up, from the bottom to the top, between the bottom wall 22 and the upper open end 24.

The walls of the body 12 define three separate storage compartments. A first compartment 30 is defined by the horizontal wall 26, the portion of the vertical wall 28 below the intersection between the horizontal and vertical walls 26 and 28, the portions of the side walls 18 and 20 below the wall 26, and the portion of the bottom wall 22 forward of the vertical wall 28. A second compartment 32 is defined by the horizontal wall 26, the portion of the vertical wall 28 above the horizontal wall 26, and the portions of the side walls 18 and 20 and front wall 14 above the horizontal wall 26. A third compartment 34 is defined by portions of the vertical wall 28, side walls 18 and 20 to the rear of the vertical wall 28, the portion of the bottom wall 22 to the rear of the vertical wall 28, and the rear wall 16.

The front wall 14 includes an opening 36 that extends from between the side walls 18 and 20 and between the forward edge of the bottom wall 16 and the horizontal wall 26. The opening 36 provides access to the first storage compartment 30 from without the box 10. Access to the second and third storage compartments 32 and 34 is through the open upper end 24 of the box 10.

A clear, molded plastic lid 38 is pivotally connected with the body 12 by a pair of conventional hinges 40 and 42. As best seen in FIGS. 3 and 4, parts of the hinges 40 and 42 are integrally molded on the rear wall 16, adjacent to its upper end. The other cooperating parts of the hinges are molded on the lid 38. Hinge pins 43 interconnect the parts of the hinges. The hinges 40 and 42 permit the lid 38 to be pivoted about the aligned axes of the hinge pins 43 between a closed position, as shown in FIGS. 1, 2, and 4, and an opened position, as shown in FIG. 3, wherein access can be had to the storage compartments 32 and 34.

A dependent, integral lip 44 is molded about the peripheral edge of the lid 38, which edge is congruent with the upper end 24 of the body 12. When the lid is in its closed position, the peripheral edge of the lid 38 overlies and the lip 44 is disposed closely adjacent to the upper edges of the walls 14-20 defining the upper end 24.

Two, over-center toggle-style latch assemblies 46 and 48 are mounted on the front wall 14 of the body 12 adjacent to the upper end 24. These latch assemblies are of conventional design and construction, and accordingly are not described further herein. Suffice it to say that they are used to secure the lid 38 in its closed position by cooperating with depressions or notches 50 and 52, as best shown in FIG. 3, molded in the front edge of the lid 38. The upper end of the front wall 14 is cut away at 54 and 56 to accommodate the lid notches 50 and 52. The latch assemblies 46 and 48 serve to hold the lid 38 tightly against the upper end 24. Generally speaking, when the lid 38 is so held, the lid 38 and the lip 44 form a relatively tight seal about the upper end 24 of the box 12. There are, however, a series of small ports (not shown) in the upper end 24 which allow any warm air and gases, that may be formed when the box 12 sits in the sun, to escape from the interior of the box.

The bottom surface of the bottom wall 22 includes several integral projections or feet 58. Similarly, the rear wall 16 includes integral projections or feet 60. These feet 58 and 60 serve to support the box when it is rested on its bottom or rear walls, respectively.

The central portion of the front wall 14 is slightly, rearwardly recessed at 62. The remaining end portions of the front wall 14 are generally flat and lie in a common vertical plane.

A plastic handle assembly 64 is positioned within the recess 62. This handle assembly includes a generally rectangular support housing 66 and a U-shaped handle 68. The housing 66 is secured to the front wall 14 by rivets and has an integral, rounded, upwardly projected tab 70 at the center of its upper edge. The ends of the handle 68 are connected with the sides of the housing 66. The handle may be pivoted from a handle rest position, as shown in FIGS. 1-4 where the bight portion 72 of the handle is disposed above the housing 66 and adjacent to the front wall 14, to a handle gripping portion, where its bight portion 72 overlies the front of the housing 66 and can be gripped by a person who wishes to carry the box 10.

The handle assembly 64 is made so that the handle has a little play in it. This enables the bight portion 72 of the handle to be snapped over the tab 70 when the handle is moved to its handle rest position. The tab then retains the handle 68 in its handle rest position until someone snaps the handle back over the tab 70. Thereafter the handle 68 may be used to carry the box 12. The use of tab 70 to retain the handle 68 in its rest position prevents the handle from overlying or blocking the opening 36 in the front wall 14 when the box 12 is in use.

As previously noted, this opening 36 permits access to the first storage compartment 30. A storage drawer 74 is slidingly received within the storage compartment 30. The drawer includes molded plastic, one piece body and a front plate 76. A plurality of integral divider walls 78 subdivide the drawer into a variety different size storage areas.

A pair of forwardly projecting pads 80 and 82 are molded on the front face of the front plate 76, with each pad being spaced about one-half way between the centerand a side edge of the plate 76. The sides of the pads are curved and provide a smooth, inclined ramp-like surface. A round recess 84 is molded in the center of each ofthe pads 80 and 82 is used in retaining the drawer 74 in its closed position as hereinafter described. The front plate 78 is secured to the body of the drawer 74 by rivets 86 that are disposed within the recesses 84. The lower, central portion of the front plate 78 is cut away, as shown at 87. This cut away portion serves as a finger hold or handle for the drawer.

As best seen in FIGS. 4 and 6, a rearwardly extending flange 88 is molded about the periphery of the front plate 76. The front wall 14 of the body 12, adjacent to the opening 36, has a groove-like structure 90 molded along the upper edge of the opening 36 and a forwardly projecting flange 92 molded about the remaining three-sides of the opening 36. When the drawer 74 is disposed within the first or drawer compartment 30, the flange 88 overlies and is closely adjacent to the flange 92 and fits within the groove 90 thereby forming a tongue and groove type seal between the body 12 and drawer 74 about the entire periphery of the opening 36. This seal prevents the ingress of rain water and other casual water into the drawer or first compartment when the drawer is in its closed position.

As illustrated in FIGS. 4 and 6, the front plate 76 lies in substantially the same plane as the end portions of the front wall 14 when the drawer 74 is in its closed position within the first compartment 30. The drawer 74 is held in its closed position by novel, pivot style latches 94 and 96 that are mounted on the front wall 14 immediately above the opening 36. In addition to securing the drawer 74 in its closed position, there latches also urge the drawer inwardly, with respect to the first compartment 30, so that the flanges 88 and 92 and groove 90 are urged into a sealing relationship.

Each of the latches 94 and 96 are identical in construction and operation. For that reason, only one, latch 96, will be specifically described. That latch is best illustrated in FIGS. 5–8. The latch 96 includes a molded plastic, generally rectangular body 98. A first end 100 of the body 98 is connected with the front wall 14 by a rivet 102. The connection between the first end 100 and the front wall 14 permits the body 98 to be pivoted about the axis of the rivet 102 between a closed drawer position, as shown in FIGS. 5 and 6, and a open drawer position, as shown in FIGS. 7 and 8.

The body 98 has a second end 104. A ball or ball bearing 106, made of a plastic material, is mounted in a recess 108 in the second end 104. The ball 106 is carried by the second end 104 as the body member 98 is pivoted about the axis of the rivet 102. When the latch 96 is in its drawer closed position, the ball 106 is partially disposed within the recess 84 in the pad 82. This cooperation between the ball 106 and recess 84 assists in retaining or "locking" the latch in its drawer closed position. A lug 110 is molded on the front wall 14 above the opening 36. The distance between the rivet 102 and the ball 106 is the same as that between the rivet 102 and the lug 110. The ball 106 is adapted to rest on and above the lug when it is desired to hold the latch 96 in its drawer open position, that is, the position shown in FIGS. 7 and 8.

As noted, the body 98 is molded from a plastic material. Normally the body 98, including the ends 100 and 104, lies in a common plane. The plastic material, however, has sufficient internal resiliency so that the second end 104 may be slightly bent or flexed and as a result, may be moved out of this common plane. This enables the end 104, including the ball 106, to pass over the lug 110 as the latch 96 is moved from its drawer closed position to its drawer open position and to pass up the side ramp surface of the pad 82 as the latch is moved from its drawer closed position to its drawer open position. The internal resiliency of the body 98 is such that when the second end 104 is moved out of the common plane, the end 104 tends to try to return to the common plane. Accordingly, when the end 104 is out of the common plane, as for example when the end 104 overlies the pad 82, the end 104 exerts a biasing force on the pad. This in turn urges the drawer 74 inwardly and also urges the tongue and groove structure, that is associated with the drawer and opening 36, into close, sealing cooperation.

The body 98 also includes a central, inwardly directed flange 112 which extends from its first end 100 toward its second end 102. Stops 114 and 116 are molded on the front wall 14 near the rivet 102. The flange 112 cooperates with these stops. This cooperation limits the pivotal movement of the latch 96 to approximately 90 degrees.

Referring now to FIGS. 3 and 4, the second storage compartment 32 includes a number of internal dividing walls 118 which serve to divide the compartment into a plurality of separate storage areas. These walls 118 extend upwardly from the horizontal wall 26 and for the most part, are molded as an integral part of the body 12. However, one of these walls, wall 120, may be removed from the box 10 by lifting the wall 120 out of grooves 122 that are molded in the dividing walls 118 and the adjacent facing parts of the vertical wall 28 and the front wall 14. By removing the wall 120, the user of the box may change the size of some of the storage areas in the compartment 32. This movable wall 120 includes slots 124 that permit the wall to fit down within the grooves 122 in the dividing walls 118. The upper ends of the dividing wall 120 have a plurality of notches 128 that permits bait and similar objects to be hung therefrom.

The upper ends of the walls 118 and 120 do not extend to the top of the second compartment, that is, to the upper end 24 of the body 12. Rather, they terminated at a uniform, predetermined distance below the upper end 24 to define a sub-compartment above the upper ends of the walls and below the upper end 24 of the body 12. This sub-compartment is adapted to receive and retain a removable, lift-out, one-piece molded plastic storage tray 130. The outer peripheral shape of the tray 130 is congruent with but slightly smaller than the internal, peripheral shape of the second compartment. Consequently, this tray 130 stays in place in the second compartment when the box 10 is being carried.

The storage tray 130 includes a number of internal, integral dividing walls 132 that serve to divide the interior of the tray into separate storage areas. The tray also includes two removable walls 134 and 136 that are similar in construction to the wall 120, except that they do not have notches at their upper ends. Grooves 138 are molded in the walls 132 to receive and secure the walls 134 and 136. By removing the walls 134 and 136, the user of the box 10 may change the size of some of the storage areas in the tray 130.

The third storage compartment 34 is deeper than the second compartment 32. Internal, removable dividing walls 140 and 142 extend upwardly from the bottom wall 22 toward the upper end 24 of the body 12 and serve to divide the compartment 34 into separate storage areas. The dividing walls 140 extend from front to rear, and their ends are adapted to be disposed within sets of vertical aligned grooves 144 molded on the facing surfaces of the rear and vertical walls 16 and 28. The walls 140 themselves include sets of grooves 146 at their mid-points. Additional grooves 148 are molded on the facing surfaces of the side walls 18 and 20 and are aligned with the grooves 146. The wall 142 extends between the side walls 18 and 20. Like the wall 120, the wall 142 includes slots 150 that permit the wall to fit within the grooves 146 and down over the walls 140. The ends of the wall 142 are also adapted to be disposed within the grooves 148. The upper ends of the walls 140 and 142 include notches 152, similar to the notches 128, which are useful for hanging baits and other equipment. The user of the box 10 may remove all or any of the walls 140 and 142 to change the size of the storage areas in compartment 34.

In conclusion, the invention described herein may be embodied in other specific forms without departing from the spirit or central characteristics thereof. The preferred embodiment described hereinabove is to be considered in all respects as illustrative and not restrictive. The scope of the invention is indicated by the appended claims, rather than by the foregoing description. All changes which come within the meaning and range of equivalency of the claims are therefore intended to be embraced therein.

We claim:

1. An improved satchel-style tackle box particularly adapted for storing and transporting tackle, baits, fishing accessories, and other equipment while the box is disposed in a vertical, upright-carry position and for permitting ready and facile access to the stored tackle, baits, fishing accessories and other equipment when the box is disposed in a horizontal, in-use position, the improved satchel-style box comprising:

a one piece, molded plastic body having a generally rectangular parallelipped shape and having a front wall, a rear wall that is opposed to the front wall, a bottom wall, first and second opposed side walls, and an open, upper end that is opposed to the bottom wall;

a first, horizontally disposed interior wall integrally molded in the body, the first interior wall being positioned upwardly from the bottom wall and extending between the side walls and rearwardly from the front wall toward the rear wall;

a second, vertically disposed interior wall integrally molded in the body, the second interior wall being positioned between the front and rear walls and extending between the side walls and upwardly from the bottom wall so that the rearwardly facing end of the first interior wall is in contact with the second interior wall between the bottom wall and the upper end of the second interior wall;

portions of the front wall, side walls, bottom wall, the first interior wall and a lower portion of the second interior wall defining a first storage compartment in the body;

other portions of the front wall and side walls, the first interior wall, and an upper portion of the second interior wall defining a second storage compartment in the body;

the side walls, second interior wall, bottom wall and rear wall defining a third storage compartment in the body;

the front wall having a front opening therein, with the front opening permitting access to the first storage compartment from the exterior of the body;

an upwardly facing drawer disposed in the front opening, the drawer being selectively slidable between a closed position wherein its interior is within the first compartment and an open position wherein the drawer extends out beyond the front wall so that access may be had to its interior from without the box;

means for selectively holding the drawer in its closed position;

lid means for selectively closing the upper end of the body;

means for connecting the lid means with the body and for permitting the lid means to be moved between a first position wherein the lid means closes the upper end of the body and a second position wherein access may be had to the second and third storage compartments through the upper open end of the body; the bottom wall of the box being capable of supporting the box horizontally when the box is its horizontally, in-use position so that the lid means is in its second position, access may be had to the second and third storage compartments through the open upper end of the box and so that access may be had to the interior of the drawer when the drawer is in its open position; and a handle mounted on the exterior face of the front wall for permitting the box to be held in its vertical, upright-carry position, with the rear wall of the box being capable of supporting the box in a vertical position while the box is disposed in its vertical, upright-carry position.

2. The improved satchel-style tackle box described in claim 1 wherein the front opening extends substantially between the side walls and between the first interior wall and the bottom wall; wherein the drawer has a front end that is adapted to completely close the front opening when the drawer is in its closed position; and wherein the selectively holding means includes latch means mounted on the exterior face of the front wall to selectively retain the drawer in its closed position within the first storage compartment.

3. The improved satchel-type tackle box described in claim 2 wherein the handle may be pivoted about a horizontal axis between a carrying position and a noncarrying position; wherein the horizontal axis is spaced above the front opening; wherein the handle is disposed above the front opening when the box is disposed in its horizontal, in-use position; and wherein the front wall includes means for selectively retaining the handle in its noncarrying position.

4. The improved satchel-style box described in claim 2 wherein a forwardly projecting groove-like structure is formed on the body about the front opening; wherein the front end of the drawer includes a face plate portion that is adapted to be positioned adjacent to the front wall of the body when the drawer is in its closed position and that has a rearwardly projecting tongue-like structure formed about its periphery; wherein the tongue-like structure of the face plate portion of the drawer is disposed in an overlapped relationship with and adjacent to the groove-like structure when the drawer is in its closed position for the purpose of preventing rain water and the like from getting into the interior of the drawer when the drawer is in its closed position.

5. The improved satchel-type box described in claim 4 wherein the groove-like structure is spaced to the rear of the vertical plane of the front wall of the body; and wherein the drawer substantially fills the first storage compartment when the drawer is in its closed position.

6. The improved satchel-style box described in claim 2 or 4 wherein the front end of the drawer includes a part that projects slightly forwardly of the vertical plane of the front wall when the drawer is in its closed position; wherein the latch means includes at least one elongated plastic latch member having a first end and a second end that are normally disposed in a common plane and that seek to return to that common plane if moved from the common plane; wherein the first end of the latch member is pivotally connected with the front wall of the body at a position above the front opening; wherein the second end of the latch member is movable, about the first end, between a drawer retention position where the second end overlies the drawer projecting part, and is thus moved out of the common plane, and a drawer open position where the second end overlies a portion of the front wall of the body.

7. The improved satchel-style box described in claim 6 wherein the front end of the drawer includes a front face portion that is generally disposed in the vertical plane of the first wall of the body; wherein the drawer projecting part is integrally formed on the front face portion; wherein the second end of the latch member carries a ball member adjacent to the front wall; wherein the drawer projecting part includes a recess for receiving the ball member when the second end of the latch member is in its drawer retention position; wherein means are formed on the front wall of the body for cooperation with the ball member for retaining the second end of the latch member in its drawer open position.

8. The improved satchel-style box described in claim 6, wherein the second storage compartment is divided into a plurality of storage areas defined by a plurality of vertically disposed storage walls, some of which storage walls being integrally formed with the body and others of which storage walls being selectively removable from the body so as to permit the size of selective storage areas to be changed; wherein the upper ends of the vertically disposed storage walls terminate short of the upper end of the body so as to define, in the second storage compartment, an upper storage area above the upper ends of the vertically disposed storage walls and below the upper end of the body; wherein a removable storage tray is adapted positioned in the upper storage area and when so positioned, to be supported on the upper ends of the vertically disposed storage walls; wherein the third storage compartment is divided into a plurality of additional storage areas defined by a plurality of additional vertically disposed storage walls; and wherein the additional vertically disposed storage walls may be selectively removed from the body so as to permit the size of the additional storage areas to be changed.

9. The improved satchel-style box described in claim 8, wherein the upper ends of some of the vertically disposed walls and the additionally vertically disposed walls include notches that permit baits to be hung therefrom.

10. The improved satchel-style box described in claim 1 wherein the second storage compartment is divided into a plurality of storage areas defined by a plurality of vertically disposed storage walls, some of which storage walls being integrally formed with the body and others of which storage walls being selectively removable from the body so as to permit the size of the selective storage areas to be changed.

11. The improved satchel-style box described in claim 10 wherein the upper ends of the vertically disposed storage walls terminate short of the upper end of the body so as to define, in the second storage compartment, an upper storage area above the upper ends of the vertically disposed storage walls and below the upper end of the body; and wherein a removable storage tray is adapted positioned in the upper storage area and when so positioned, to be supported on the upper ends of the vertically disposed storage walls.

12. The improved satchel-style box described in claim 10 wherein the third storage compartment is divided into a plurality of additional storage areas defined by a plurality of additional vertically disposed storage walls; and wherein the additional vertically disposed storage walls may be selectively removed from the body so as to permit the size of the additional storage area to be changed.

13. The improved satchel-style box described in claim 12 wherein the upper ends of some of the vertically disposed storage walls and the additional vertically disposed storage walls include notches that permit baits to be hung therefrom.

* * * * *